Figure 1:
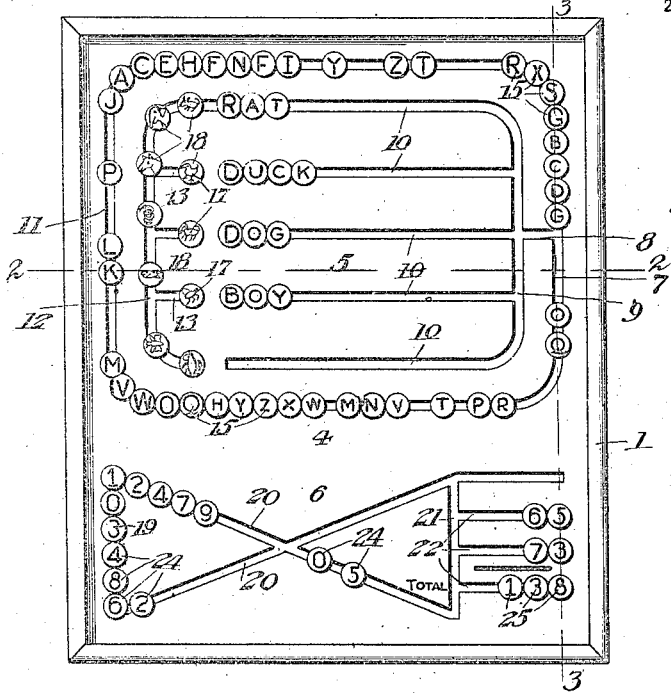

J. H. DIXON.
EDUCATIONAL TOY.
APPLICATION FILED APR. 3, 1917.

1,248,286.

Patented Nov. 27, 1917.
2 SHEETS—SHEET 1.

WITNESS
R. E. Rousseau

INVENTOR
J. H. Dixon,
BY Victor J. Evans
ATTORNEY

J. H. DIXON.
EDUCATIONAL TOY.
APPLICATION FILED APR. 3, 1917.

1,248,286.

Patented Nov. 27, 1917.
2 SHEETS—SHEET 2.

WITNESS.
A. E. Rousseau.

INVENTOR
J. H. Dixon,
BY Victor J. Evans
ATTORNEY

UNITED STATES PATENT OFFICE.

JOSEPH H. DIXON, OF ELYRIA, OHIO.

EDUCATIONAL TOY.

1,248,286.  Specification of Letters Patent.  Patented Nov. 27, 1917.

Application filed April 3, 1917. Serial No. 159,540.

*To all whom it may concern:*

Be it known that I, JOSEPH H. DIXON, a citizen of the United States, residing at Elyria, in the county of Lorain and State of Ohio, have invented new and useful Improvements in Educational Toys, of which the following is a specification.

This invention relates to educational toys or devices comprising a holder carrying a series of movable buttons with letters, figures, etc., on them, and which buttons are adapted to be shifted into various assortments thereby assisting the child in learning to spell, add and subtract in an agreeable and pleasant manner.

In carrying out my invention it is my purpose to produce an educational device in the nature of a board, one of the faces thereof being treated to provide a blackboard, the opposite face being in the nature of a holder having continuous passageways therein and various transverse passages communicating therewith, and a series of double-headed buttons having their shanks arranged in the passageways and their heads provided upon their outer faces with letters and with numerals, the buttons provided with the numerals being arranged in one of the continuous passages and the buttons provided with the letters being arranged in the other continuous passages, each of said buttons being susceptible for movement through the continuous passages into the transverse passages whereby interchanging of the said buttons will provide for the spelling of different words, sentences and the arrangement of the buttons provided with the numerals in their transverse passages permits of a child being instructed in addition, subtraction and multiplication. I also provide an elongated passage having reduced transverse branches communicating therewith, the said branches being arranged in a line with the transverse passages in which are received the button members provided with the letters and in the last named passages I arrange additional button members having the outer faces thereof imprinted with various characters or forms of animals, so that when the buttons are moved to be arranged in the short passages the child may manipulate the lettered buttons and arrange the same opposite the character buttons to properly spell the name of the character indicated upon such buttons, and thus producing an entertaining instruction device for the child.

With the above and other objects in view the improvement resides in the construction, combination and arrangement of parts set forth in the following specification and falling within the scope of the appended claims.

Figure 5:
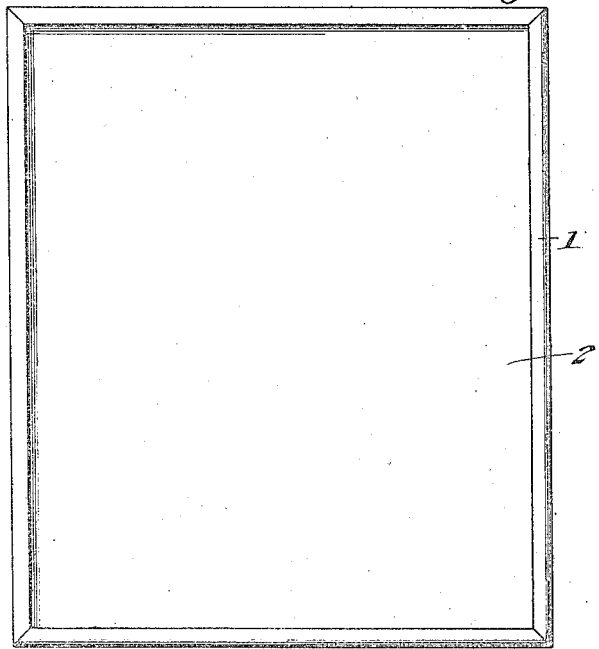
Figure 4:
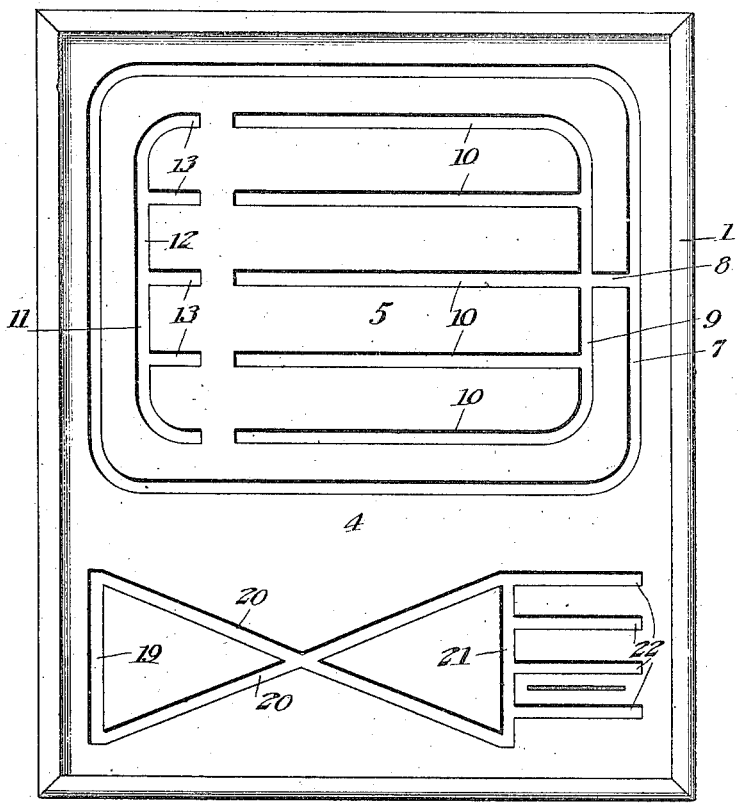
Figure 3:
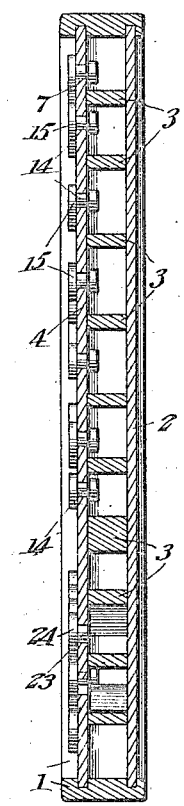
Figure 2:
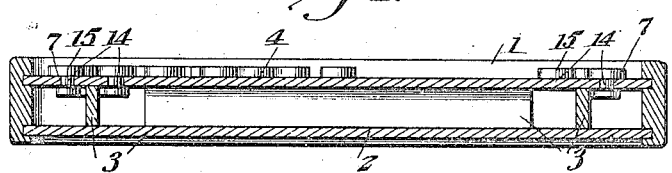
Figure 6:
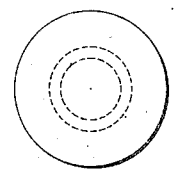

In the drawings:

Figure 1 is a plan view of an educational board constructed in accordance with the present invention, Fig. 2 is a sectional view approximately on the line 2—2 of Fig. 1, Fig. 3 is a sectional view approximately on the line 3—3 of Fig. 1, Fig. 4 is a view of the device with the buttons removed, and Fig. 5 is a view looking toward the rear of the device.

While it is to be understood that my improved educational device may be of any desired size or shape, I have in the accompanying drawings illustrated the same as being of a substantially rectangular formation.

In carrying out my invention I produce a frame 1 which provides the continuous flange for the device. I secure within the frame, adjacent one of the open faces thereof a board 2 and the outer face of this board is treated with a suitable substance to blacken or otherwise color the same so that the said outer face of the device is in the nature of a blackboard and adapted to receive chalk marks by the user of the device. The edges of the board 2 are preferably let in the frame 1 so as to provide a firm and secure connection between the board and frame. The outer face of the board is disposed only a slight distance away from one of the outer surfaces of the frame, so that the inner face of the said board is arranged a greater distance away from the opposite face of the frame. The inner face of the board has secured thereto a plurality of angularly arranged cleats 3 upon which rest and to which is secured the outer face or plate 4 of the device. The plate 4 is also preferably let in the sides of the frame 1 and its connection with the cleats 3 is such as to retain the plate against bulging, etc. The plate 4, which I will hereinafter refer to as the outer face of the device, may be constructed of any desired material, such as a sheet of compressed cardboard, commonly known as wall board, metal or the like, and the same is divided into what I will term two fields indicated by the numerals 5 and 6 respectively. The field 5 is arranged upon what may be termed the top of the device and is provided with a continuous groove 7. Three of the passages of the same are arranged a suitable distance inward of the frame 1, the remaining connecting passage being disposed a short but suitable distance upward of the field 6. The corners of the walls provided with the grooves 7 are rounded, and one of the passages of the groove adjacent one of the sides of the frame is formed with a slot 8 that communicates with a groove 9 arranged transversely with respect to the slot 8 and parallel with the passage in the continuous groove that communicates with the said groove 9. Communicating with the groove 9 is a plurality of spaced transversely disposed grooves 10 respectively, and these grooves terminate a suitable distance away from the longitudinal groove opposite that provided with the slot 8 and which for distinction is indicated by the character 11. Disposed parallel but spaced inwardly from the groove 11 is a groove 12 that is provided with a plurality of angularly disposed slots 13 each of the said slots being arranged in a line with but spaced from the terminals of the transverse grooves 10. Within the continuous grooves 7 is arranged the shanks 14 of a plurality of double-headed buttons 15. The heads of these buttons may frictionally contact with the opposite faces of the plate 4 or the shanks may so contact with the opposite walls provided by the grooves as to retain the same against accidental movement. The outer faces of each of the buttons 15 has inscribed thereon a letter of the the alphabet as indicated by the character 16, and it will be noted that by moving the buttons through the continuous groove to bring the same through the slot 8 to within the groove 9 the said buttons may be readily arranged in any of the transverse grooves 10. The letters upon the buttons are so arranged as to spell various words or sentences, but primarily the buttons are adapted to be manipulated and properly positioned in the said transverse grooves 10 to properly spell the name or title of a device or character 17 arranged upon the outer faces of double-headed buttons 18, the shanks of which being disposed in the groove 12. By reference to the drawings it will be noted that the characters 17 upon the buttons 18 mostly represent the figures of animals, birds, fowls and rodents, and when the buttons representing one of such characters is moved into one of the slots 13 it is the object of the child using the board to properly manipulate the buttons 15 to bring certain of the same in the transverse groove 10 opposite the slot 13 in which the referred to button 18 is arranged so that the letters upon the said buttons 15 will be assembled to spell the nature of the character represented upon the said button 18.

The field 6 below the branch 11 of the continuous groove 7 in the field 5 is provided with a groove 19, alining with the said groove 11 but, of course, spaced therefrom. The field is provided with angularly disposed groove 20—20 extending at opposite angles from the ends of the groove 19 and centrally intersecting each other, and these grooves communicate with a groove 21 disposed parallel with the groove 19.

Communicating with the groove 21 is a plurality of transversely disposed grooves or notches 22 respectively, four being illustrated in the drawings. The continuous substantially X-shaped groove receives the shanks 23 of double-headed button members 24, and the outer face of the said button members are provided with numerical characters 25. The buttons are adapted to be so manipulated as to arrange certain of the same in certain of the transverse grooves or notches 22, one below the other, the lowermost of which being left vacant. The numerals upon the buttons may be added, subtracted or multiplied and the answer to the sum is adapted to be arranged in the lowermost transverse groove or notch 22, the buttons in the continuous groove being so manipulated as to properly arrange the said buttons in the said lower notch or transverse groove to define the proper answers to the mathematical problem.

It is to be understood that the cleats 3 are so arranged as to be positioned adjacent the opposite walls defined by the various grooves and slots, and I desire to state that I am well aware of spelling boards or puzzles comprising a holder member having a series of communicating slots designed to receive button members or blocks having numerical, alphabetical and other characters thereon designed to be properly arranged in one or more of the said slots to produce completed words, sentences, etc.; therefore, I do not claim the combination of these elements broadly in this application.

Having thus described the invention, what I claim is:

1. An educational board comprising a plate, a frame surrounding the plate, said plate having oppositely disposed parallel grooves, and angular branch slots communicating with the grooves and extending in the same direction but terminating away from each other, oppositely headed elements in both of the grooves and designed to be moved therefrom into the branch slots, the headed elements in one of the grooves having figures imprinted thereon, the headed elements in the other groove having alphabetical characters thereon and whereby when the members having the figures are moved from the groove to the branch slot thereof, the headed elements are designed to be manipulated in the other groove to arrange the same in the branch slot opposite that within which the said figured headed element is arranged to spell the name or title of the figure upon the element in the said branch slot.

2. An educational device comprising a frame, a board within the frame adjacent one of the edges thereof, a plate in the frame adjacent the opposite edge thereof, spacing elements between the board and plate, said plate having a continuous groove, end grooves arranged inwardly and parallel with two of the passages of the said continuous groove, a communicating passage between the continuous groove and one of the inner grooves, each of said inner grooves having angularly disposed branch passages communicating therewith but terminating away from each other, oppositely headed button members within the continuous groove and within one of the inner grooves, said last mentioned buttons having characters designating animals, birds, etc., thereon, the buttons in the remaining groove having alphabetical characters thereon, said figure buttons designed to be moved to the branch passages of the grooves within which they are arranged and the lettered buttons designed to be manipulated through the continuous groove into the inner groove communicating therewith and to be arranged in the branch passages of the said inner groove opposite the figure buttons in the branch passages of the other inner groove to arrange the said lettered buttons to spell the names of the characters upon the figure buttons, and to arrange the said lettered buttons in the branch passages opposite the figure buttons to properly spell the name of the character upon the said figure buttons.

In testimony whereof I affix my signature.

JOSEPH H. DIXON.

Copies of this patent may be obtained for five cents each, by addressing the "Commissioner of Patents, Washington, D. C."